United States Patent [19]
Nakamura et al.

[11] Patent Number: 5,730,793
[45] Date of Patent: Mar. 24, 1998

[54] METHOD FOR DISPERSING PIGMENTS

[75] Inventors: Masayoshi Nakamura; Hiroyoshi Kawase; Shougo Kodama, all of Tokyo, Japan

[73] Assignee: Nikkato Corp., Osaka, Japan

[21] Appl. No.: 351,082

[22] Filed: Nov. 30, 1994

[30] Foreign Application Priority Data

Nov. 30, 1993 [JP] Japan ............................ 5-326171

[51] Int. Cl.⁶ .................................................. C09B 67/04
[52] U.S. Cl. .................................. 106/412; 106/401
[58] Field of Search .............................. 106/401, 412

[56] References Cited

FOREIGN PATENT DOCUMENTS

| 0483808 | 5/1992 | European Pat. Off. |
| 2-132162 | 5/1990 | Japan. |
| 5-46248 | 7/1993 | Japan. |
| 679552 | 9/1950 | United Kingdom. |

OTHER PUBLICATIONS

Perry's Chemical Engineers' Handbook. 6th ed., McGraw-Hill, NY, pp. 8–32, 33, 35, 36, Dec. 1984.
Derwent abstract AN 90-198251 of JP 5-46248.
International Journal of Mineral Processing. 22 (1981) 431–444. N. Stehr, "Recent Developments in Stirred Ball Milling" (no month).

*Primary Examiner*—Mark L. Bell
*Assistant Examiner*—Scott L. Hertzog
*Attorney, Agent, or Firm*—Sughrue, Mion, Zinn, Macpeak & Seas, PLLC

[57] ABSTRACT

A method for dispersing a pigment is disclosed, wherein the pigment is dispersed in a medium solution by using sintered zirconia beads having an average particle diameter of 40 to 192 μm, a density of 5.9 $g/cm^3$ or more, and a sphericity of 1.07 or smaller. The method is particularly useful for providing an excellent coating gloss when the medium solution is a binder for forming a paint or a coating composition or a binder for forming an ink composition.

5 Claims, No Drawings

METHOD FOR DISPERSING PIGMENTS

FIELD OF THE INVENTION

The present invention relates to a method for dispersing pigments using a ball mill, a pebble mill, a sand mill, a high-speed agitating mill, a vibration mill, etc.

BACKGROUND OF THE INVENTION

Previously, the present inventors proposed a method for dispersing a pigment in a medium solution (vehicle), characterized in that a sintered zirconia ball having an average particle diameter of about 200 to 350 µm, preferably in the vicinity of 250 µm is used in the dispersing step using a ball mill, a pebble mill or a sand mill, as disclosed in JP-B-5-46248 (also JP-A-2132162). (The term "JP-B" as used herein means an "examined Japanese patent publication".)

At this stage, however, it was never noticed that a medium such as the sintered zirconia ball greatly affected on the specular gloss degree on a coated surface of a paint which was provided by using the medium.

Furthermore, in order to obtain a Gs (60°) value of 100 or more as the surface gloss degree of the coating, it is necessary to conduct at least seven or eight mill passes in the production of a paint. Such a large number of steps necessitates much operation time and thereby causes to contaminate the surface and increases costs.

SUMMARY OF THE INVENTION

An object of the present invention is to provide a novel method for dispersing a pigment which is capable of remarkably increasing the surface gloss degree of a coated surface of a paint obtained thereby while also minimizing the number of mill passes.

As a result of earnest studies on obtaining a coating which is excellent in the surface gloss degree while requiring only a small number of mill passes in a method for dispersing a pigment in the production of a coating composition, ink composition, etc., the present invention has been completed.

The present invention has been accomplished by a method for dispersing a pigment, characterized in that the pigment is dispersed in a medium solution by using sintered zirconia beads having an average particle diameter of about 40 to 192 µm, preferably 100 to 192 µm, more preferably 130 to 192 µm, a density of about 5.9 g/cm³ or more, preferably about 5.95 g/cm³ or more, more preferably about 6.0 g/cm³ or more, and a sphericity of about 1.07 or smaller.

In the present invention, the medium solution is composed of a resin, a solvent and additives.

In a preferred embodiment, an average particle diameter standard deviation of the sintered zirconia beads, y, is represented by the following equation:

$$y \leq -9.515 \times 10^{-5} x^2 + 7.248 \times 10^{-2} x + 2.915$$

(where x is an average particle diameter of the sintered zirconia bead in µm).

Furthermore, when the medium solution is a binder for forming a paint or coating composition or a binder for forming an ink composition, the method of the present invention can provide a paint or ink which is capable of providing a wonderful coating gloss.

DETAILED DESCRIPTION OF THE INVENTION

The dispersing of a pigment in a medium solution (vehicle) means to homogeneously monodisperse the pigment in the medium solution (vehicle). In dispersing, a pigment in an agglomerated state is disintegrated by imparting a shearing force to make single fine particle substances of the pigment. At this time, the shearing force on the agglomerate is important, and it is imparted by the movement of bead media. As the bead media are small, the number of beads per unit volume is great. The number of contact points between beads becomes large in proportion to the cube of the bead diameter per unit volume, and the shearing force on a pigment particle between the contact points of the beads increases accordingly. Moreover, the amounts of pigment present in the gap between the beads is small, as the bead diameter is small, thereby providing good dispersing. However, even though the beads having the diameter of smaller than 40 µm are obtained, desired effect cannot be obtained due to, for instance, secondary agglomeration.

Production Method of Zirconia Beads

The production method of zirconia beads is explained below. As an agitating means for granulating "green beads" (pre-sintered beads), those granulating devices disclosed in JP-B-39-21502, JU-B-44-19507, JU-B-48-41284, JU-B-53-39737, U.S. Pat. No. 5,152,942, EP-A-0534027, JP-A-6-126147, etc. can be used. (The term "JU-B" as used herein means an "examined published Japanese utility model publication", and the term "JP-A" as used herein means an "unexamined published Japanese patent application".) The granulating conditions vary depending on the size of bead to be obtained. For instance, a commercially available zirconia powder containing yttria as a stabilizer is supplied into the agitating vessel of a granulating machine, then an organic solvent (e.g., petroleum based hydrocarbons) is poured thereinto to obtain a zirconia suspension, a predetermined binder such as water further is added thereinto, and then the agitating blade is rotated for a predetermined number of rotations for a predetermined period to form a granular product. The granular product thus obtained is called "green beads". Thereafter, the granular product is dried at 60° C. for 24 hours and sintered at 1450° C. for 2 hours to obtain desired sintered zirconia beads. In cases of using the same raw powder, the same organic solvent, the same number of agitating blade rotations and the same granulating time in preparing the green beads, for obtaining a spherical form having a different average diameter, it is necessary to change the amount of the binder or modify the binder supplying method (e.g., either adding the binder portion by portion or adding the binder at one time), or it is necessary to simultaneously use a surface active agent that is well soluble in water (e.g., alcohols) to decrease the interfacial tension of water.

The production method of zirconia beads having an average particle diameter of 40 to 192 µm is explained below.

Tap water can be used as a binder, independent of the particle diameters. In a case of obtaining sintered zirconia beads having an average particle diameter of 192 µm, 8 to 12 wt %, preferably 9 to 10 wt % of a binder (based on the amount of a raw zirconia powder to be used) is added portion by portion.

With the start of granulation, 50% of the binder is added, and with the lapse of a predetermined period of time, the remaining 50% of the binder is added at a predetermined interval by several portions to complete the granulation. The granulating period is about 195 to 205 minutes, preferably about 200 minutes.

In a case of obtaining beads having an average particle diameter of 98 µm, 7.5 to 8.5 wt %, preferably 7.8 to 8.3 wt % of a binder (based on the amount of a raw zirconia powder to be used) is added portion by portion. The division of the binder amount is in the same manner as described above. The granulating period is about 200 to 215 minutes, preferably about 210 minutes.

In a case of obtaining beads having an average particle diameter of 42 μm, 13 to 17 wt %, preferably 14.5 to 15.5 wt % of 99.5% pure ethyl alcohol (based on the amount of a raw zirconia powder to be used) is added to a suspension of a zirconia powder and an organic solvent. After agitating for several minutes, 7.0 to 8.2 wt %, preferably 7.4 to 7.8 wt % of a binder is added portion by portion. The division of the binder is in the same manner as described above. The granulating period is about 200 to 215 minutes, preferably about 210 minutes.

In any case, the internal temperature in the agitating vessel is about 70° C. or lower, preferably about 45° C. or lower and the internal pressure in the agitating vessel is about 1.2 kgf/cm$^2$ or lower, preferably about 0.6 kgf/cm$^2$ or lower.

The zirconia beads thus obtained are sintered at 1450° C. for 2 hours under an oxidative atmosphere to provide a sintered product of zirconia beads. If necessary, the surface thereof is abraded to provide a final product. Thus, zirconia beads having desired particle diameters can be obtained for dispersing a pigment.

Method of Dispersing Pigment

In the following, a method of dispersing a pigment is explained.

A mill base is prepared by mixing a pigment, a resin solution, a solvent and additives. Zirconia beads having nearly the same volume as that of the mill base are added to a dispersing mill, and processed at a rotation number of about 500 to 2200 rpm for about 15 minutes to 2 hours to disperse the pigment in the vehicle. As the dispersing mill, a ball mill, a pebble mill, a sand mill, a vibration mill, etc., can be used.

As the pigment, any conventional pigment can be used, including, for example, inorganic pigments (e.g., carbon black, titanium white, iron oxide), organic pigments (e.g., Toludine red, Fast yellow, Carmine FB), etc.

In the present invention, the medium solution is composed of a resin, a solvent and additives (e.g., surface active agent).

As the resin, any conventional resin can be used, including, for example, natural resins (e.g., linseed oil, palm oil, castor oil), synthetic resins (e.g., acrylic resin, bisphenol resin, ethylcellulose), etc.

As the solvent, any conventional solvent (e.g., xylene, isopropylether, mineral spirits) can be used.

As the additive, any conventional additive can be used, including, for example, a surfactant such as anionic surfactant, cationic surfactant, amphoteric surfactant and non-ionic surfactant, etc.

The use of the present invention is not limited to a paint or coating composition but can be applied to any cases where there is a step which needs to disperse fine particles in a liquid material, e.g., an ink or a dye.

The present invention will be further described in the following non-limiting production examples and examples. Unless otherwise indicated, all parts, percents, ratios, and the like are by weight.

PRODUCTION EXAMPLE 1

Zirconia beads having an average particle diameter of 192 μm were prepared as follows:

A cylindrical agitating vessel (inner volume: 3000 ml) was charged with 80 g of commercially available zirconia powder (average particle size: 0.49 μm, specific surface area: 7.5 m$^2$/g) containing a small amount of yttria as a partial stabilizer and 2800 ml of a paraffinic solvent, then the contents were mixed for 5 minutes with the agitating blade rotating at 1950 rpm. After 3.8 ml of tap water was added thereto while rotating the agitating blade for 100 minutes, 1.0 ml, 1.0 ml, 0.5 ml, 0.5 ml, 0.4 ml, and finally 0.4 ml of water were added at 15-minutes intervals, respectively, with agitating. As the binder, the total amount of added water was 7.6 ml. The total granulating period was 200 minutes inclusive of the 5 minutes for the initial granulation. After the granulation was completed, the resulting contents were taken out from the outlet of the agitating vessel and separated into an organic medium and a granulated product by filtration. After the granulated product was dried at 60° C. for 24 hours, the dried product was sintered at 1450° C. for 2 hours to obtain sintered zirconia beads.

With respect to the final zirconia beads, the average particle diameter and the sphericity were determined by an image analyzer (LUZEX 50 made by NIRECO CO.), and the density was determined by the Archimedes method. The determined results are set forth below. For determination, 100 test samples were selected at random. The average particle diameter of beads is an average value of the maximum particle diameter (ML) of each bead obtained from an image of the image analyzer and the width thereof (BD), which is represented as (ML+BD)/2. The sphericity is represented as ML/BD. Thus, since ML/BD=1 is a real sphere, as the value is close to 1, the sphericity is high.

Average Diameter (μm): 192
Sphericity: 1.04
Standard Deviation (μm): 9
Density (g/cm3): 6.001

EXAMPLE 1

A mill base was prepared using a red color AZO Lakered as a pigment, an alkyd resin as a resin, a sorbitan type surfactant as a dispersing agent, and toluene as a solvent. The amounts thereof were as below:

AZO Lakered: 20 wt %
Alkyd Resin: 30 wt %
Dispersing Agent: 1 wt %
Solvent: 49 wt %
Average Particle Diameter of Beads Used: 192 μm Sintered zirconia beads having an average particle diameter of 192 μm obtained in Production Example 1 which had the same volume as that of the mill base were dispersed at a rotation number of 1500 rpm using a high speed agitation mill with a volume of 0.6 liter. The specular gloss degrees (the brightness on the coated surface provided by coating the coating composition), Gs (60°), after 1, 2, 3 and 4 mill passes were measured as below:

| Number of Mill Passes | Specular Gloss Degree (60 Degrees) <Gs (60°)> |
| --- | --- |
| 1 | 60 |
| 2 | 72 |
| 3 | 102 |
| 4 | 115 |

The specular gloss degrees at 60 degrees (Gs (60°)) were measured using a UGV-4K made by Suga Testing Machine K.K. This measurement was in accordance with JIS Z8974-1983. In this measurement, the specular gloss degree is represented by:

$$Gs(60)=\rho v(60)/\rho_0(60) \times 100$$

where $\rho_o(60)$ is a specular reflectance on a standard surface and $\rho v(60)$ is a specular reflectance (visual appreciation) at an incidental angle of 60 degrees.

Usually, the value of Gs (60°) is lower than 100. In the example of the present invention, however, a value of 100 or above could be obtained, and the obtained values were shown as they were. For reference, until the number of mill passes was 9 times, Gs (60°) was gradually increased, but it decreased at the point of 10 times. This is apparently due to the occurrence of secondary agglomeration.

In cases of using conventional fine beads, to obtain Gs (60°) of 80 to 90 necessitates mill pass numbers of as much as 10 or more times. Accordingly, much time is necessary for dispersing.

PRODUCTION EXAMPLE 2

Zirconia beads having an average particle diameter of 98 µm were prepared as follows:

A cylindrical agitating vessel (inner volume: 3000 ml) was charged with 80 g of commercially available zirconia powder (average particle size: 0.49 µm, specific surface area: 7.5 m²/g) containing a small amount of yttria as a partial stabilizer and 2800 ml of a paraffinic solvent, then the contents were preliminarily mixed for 5 minutes with the agitating blade rotating at 1950 rpm. After 3.2 ml of tap water was added thereto while rotating the agitating blade for 110 minutes, 1.0 ml, 1.0 ml, 0.3 ml, 0.3 ml, 0.2 ml, 0.2 ml, 0.1 ml and 0.1 ml of water were added by portion at 10-minutes intervals, respectively, using a mircosyringe. As the binder, the total amount of added water was 6.4 ml. The total granulating period was 200 minutes inclusive of the 5 minutes for the preliminary mixing at the starting of granulation. After the granulation was completed, the resulting contents were taken out from the outlet of the agitating vessel and separated into an organic medium and a granulated product by filtration. After the granulated product was dried at 60° C. for 24 hours, the dried product was sintered at 1450° C. for 2 hours to obtain sintered zirconia beads.

The average particle diameter, sphericity and density were determined in the same manner as in Production Example 1. The results are set forth below:
Average Diameter (µm): 98
Sphericity: 1.05
Standard Deviation (µm): 7
Density (g/cm³): 6.000

EXAMPLE 2

A mill base was prepared using a red color AZO Lakered as a pigment, an alkyd resin as a resin, a sorbitan type surfactant as a dispersing agent, and toluene as a solvent. The amounts thereof were as below:
AZO Lakered: 20 wt %
Alkyd Resin: 30 wt %
Dispersing Agent: 1 wt %
Solvent: 49 wt %
Average Particle Diameter of Beads Used: 98 µm (obtained in Production Example 2)

Sintered zirconia beads having an average particle diameter of 98 µm obtained in Production Example 2 which had the same volume as that of the mill base were dispersed at a rotation number of 800 rpm using a high speed agitation mill with a volume of 0.6 liter. The specular gloss degrees, Gs (60°), after 1, 2 and 3 mill passes were measured in the same manner as in Production Example 1. The results are set forth below.

| Number of Mill Passes | Specular Gloss Degree (60 Degrees) <Gs (60°)> |
|---|---|
| 1 | 68 |
| 2 | 97 |
| 3 | 105 |

From these results, it can be seen that an extremely high specular gloss degree was obtained after 2 mill passes.

PRODUCTION EXAMPLE 3

Zirconia beads having an average particle diameter of 42 µm were prepared as follows:

A cylindrical agitating vessel (inner volume: 3000 ml) was charged with 80 g of commercially available zirconia powder (average particle size: 0.49 µm, specific surface area: 7.5 m²/g) containing a small amount of yttria as a partial stabilizer, 2800 ml of a paraffinic solvent and 12 g of 99.5% pure ethyl alcohol, then the contents were preliminarily mixed for 5 minutes with the agitating blade rotating at 1950 rpm. After 3.0 ml of water was added thereto as a binder while rotating the agitating blade for 100 minutes, 1.0 ml, 0.5 ml, 0.5 ml, 0.28 ml, 0.2 ml, 0.2 ml, 0.2 ml, 0.2 ml and 0.2 ml of water were added at 10-minutes intervals, respectively, with agitating. As the binder, the total amount of added water was 6.28 ml. The total granulating period was 200 minutes inclusive of the 5 minutes for the preliminary mixing at the starting of granulation. After the granulation was completed, the resulting contents were taken out from the outlet of the agitating vessel and separated into an organic medium and a granulated product by filtration. After the granulated product was dried at 60° C. for 24 hours, the dried product was sintered at 1450° C. for 2 hours to obtain sintered zirconia beads.

The average particle diameter, sphericity and density were determined in the same manner as in Production Example 1. The results are set forth below:
Average Diameter (µm): 42
Sphericity: 1.05
Standard Deviation (µm): 6
Density (g/cm³): 5.965

EXAMPLE 3

A mill base was prepared using a red color AZO Lakered as a pigment, an alkyd resin as a resin, a sorbitan type surfactant as a dispersing agent, and toluene as a solvent. The amounts thereof were as below:
AZO Lakered: 20 wt %
Alkyd Resin: 30 wt %
Dispersing Agent: 1 wt %
Solvent: 49 wt %
Average Particle Diameter of Beads Used: 42 µm (obtained in Production Example 3)

Sintered zirconia beads having an average particle diameter of 42 µm obtained in Production Example 3 which had the same volume as that of the mill base were dispersed at a rotation number of 2400 rpm for 12 minutes using a high speed agitation mill with a volume of 0.3 liter in a batch process. After separation of the mill base and the beads, a sample solely containing the mill base was collected and mixed again with the separated zirconia beads to conduct a second dispersing. In the same manner, a third dispersing was conducted. The specular gloss degree, Gs (60°), of each sample was measured in the same manner as in Example 1.

|  | First Sample | Second Sample | Third Sample |
|---|---|---|---|
| Ga (60°) | 72 | 93 | 101 |

As described above, it is apparent that the present invention can provide the following effect:
(1) The surface gloss of a coating is surprisingly improved.
(2) The hiding power by a coating is improved.
(3) The number of mill passes is reduced, whereby the operation time is considerably shortened.

While the invention has been described in detail and with reference to specific embodiments thereof, it will be apparent to one of ordinary skill in the art that various changes and modifications can be made therein without departing from the spirit and scope thereof.

What is claimed is:

1. A method for dispersing a pigment, comprising milling the pigment in a medium solution by using sintered zirconia beads having an average particle diameter of 40 to 192 µm, a density of 5.9 g/cm$^3$ or more, and a sphericity of 1.07 or smaller, wherein an average particle diameter standard deviation of the sintered zirconia beads, Y, is represented by the following equation:

$$Y \leq -9.515 \times 10^{-5} X^2 + 7.248 \times 10^{-2} X + 2.915$$

where X is an average particle diameter of the sintered zirconia bead in µm.

2. A method for dispersing a pigment as claimed in claim 1, wherein the medium solution is a binder for forming a coating composition or a binder for forming an ink composition.

3. A method for dispersing a pigment as claimed in claim 1, wherein the density of the sintered zirconia beads is 5.95 g/cm$^3$ or more.

4. A method for dispersing a pigment as claimed in claim 3, wherein the medium solutions is a binder for forming a coating composition or a binder for forming an ink composition.

5. A method for dispersing a pigment as claimed in claim 1, wherein the density of the sintered zirconia beads is 6.0 g/cm$^3$ or more.

* * * * *